R. R. BALL.

Improvement in Shutter-Fasteners.

No. 131,145.

Patented Sep. 10, 1872.

Witnesses:
A. Bennerkendorf.
Alex F. Roberts

Inventor:
R. R. Ball
per
Attorneys.

UNITED STATES PATENT OFFICE.

ROBERT R. BALL, OF WEST MERIDEN, CONNECTICUT.

IMPROVEMENT IN SHUTTER-FASTENERS.

Specification forming part of Letters Patent No. 131,145, dated September 10, 1872; antedated September 5, 1872.

Specification describing a new and Improved Window-Blind Fastening, invented by ROBERT R. BALL, of West Meriden, in the county of New Haven and State of Connecticut.

The invention consists in the novel construction of the joint of detachable fastening-bars or devices for shutters, as hereinafter described.

Figure 1:
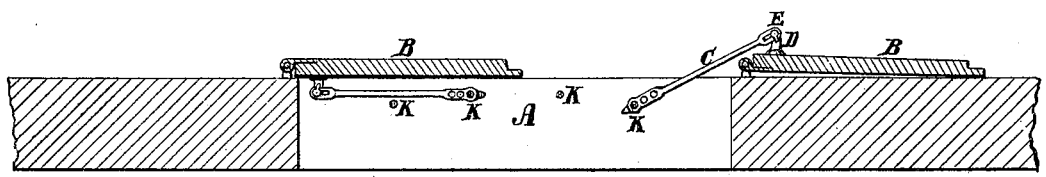
Figure 2:
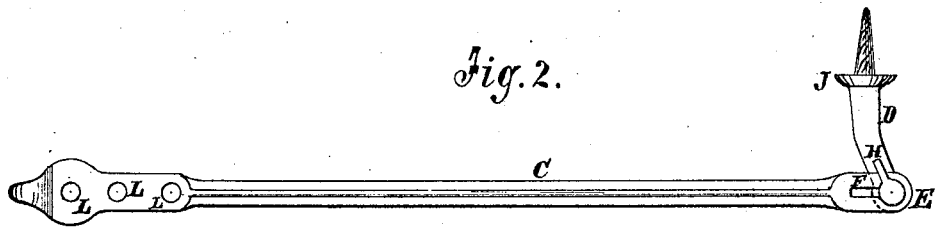
Figure 3:
Figure 4:
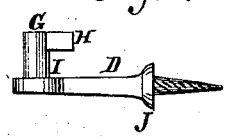

In the accompanying drawing, Figure 1 represents a horizontal section of a window, showing my improved fastening applied to the blinds. Fig. 2 is a top view of the fastening-bar and hook detached, the two parts being joined together according to my invention. Fig. 3 is an edge view of the fastening-bar. Fig. 4 is an edge view of the hook.

Similar letters of reference indicate corresponding parts.

A is the window-sill. B B represents the blinds. C is the fastening-bar. D is the hook. E is the joint by which the bar and the hook are connected together. This joint is formed by the slotted opening F in the end of the bar C, and the pintle G, with the wing H thereon, of the hook D. The bar plays around the pintle in the space I beneath the wing H, so that the bar is prevented from rising from the hook. The hook is screwed into the blind up to the collar J. K represents metallic pins or studs in the window-sill, more or less in number. L represents holes in the bar C, by means of which the bar is adjusted on the pins K so as to hold the blind either open or closed, or in any desired intermediate position.

The advantages are that I am enabled to make a very cheap and effective fastening by this mode of construction, as the parts are cast of malleable iron or other suitable metal, and require no fitting after leaving the foundry. The blinds are readily opened and closed, or adjusted in any desired position, from the inside.

I do not confine myself to the precise form of the parts composing my fastening, as they may be varied without departing from my invention.

Having thus described my invention, I claim as new, and desire to secure by Letters Patent—

In shutters or blind-fasteners, the end of bar C, slotted at F, in combination with hook D having pintle G I and wing H, as and for the purpose described.

ROBERT R. BALL.

Witnesses:
    T. B. MOSHER,
    GEO. W. MABEE.